(12) United States Patent
Kawada et al.

(10) Patent No.: US 9,972,139 B2
(45) Date of Patent: May 15, 2018

(54) IMAGE PROCESSING APPARATUS, IMAGE PROCESSING METHOD AND PROGRAM

(75) Inventors: Shigeru Kawada, Tokyo (JP); Hiroyuki Aga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 830 days.

(21) Appl. No.: 14/236,144

(22) PCT Filed: Sep. 10, 2012

(86) PCT No.: PCT/JP2012/073034
§ 371 (c)(1),
(2), (4) Date: Jan. 30, 2014

(87) PCT Pub. No.: WO2013/054619
PCT Pub. Date: Apr. 18, 2013

(65) Prior Publication Data
US 2014/0168211 A1    Jun. 19, 2014

(30) Foreign Application Priority Data

Oct. 14, 2011   (JP) .................................. 2011-226660

(51) Int. Cl.
*G06T 19/20* (2011.01)
*H04N 13/00* (2018.01)

(52) U.S. Cl.
CPC ......... *G06T 19/20* (2013.01); *H04N 13/0022* (2013.01)

(58) Field of Classification Search
USPC ....................................................... 345/419
See application file for complete search history.

(56) References Cited

U.S. PATENT DOCUMENTS

| | | | | |
|---|---|---|---|---|
| 2006/0204075 | A1* | 9/2006 | Mashitani | H04N 13/0003 382/154 |
| 2011/0080466 | A1* | 4/2011 | Kask | G06T 7/0022 348/43 |
| 2011/0158504 | A1* | 6/2011 | Turner | H04N 13/026 382/154 |
| 2011/0304708 | A1* | 12/2011 | Ignatov | H04N 13/0022 348/51 |
| 2012/0127264 | A1* | 5/2012 | Jung | H04N 13/0007 348/42 |
| 2012/0169716 | A1* | 7/2012 | Mihara | H04N 13/0275 345/419 |
| 2012/0274629 | A1* | 11/2012 | Baek | H04N 13/0271 345/419 |

(Continued)

FOREIGN PATENT DOCUMENTS

| | | |
|---|---|---|
| JP | 2007-037619 | 2/2007 |
| JP | 2011-055022 | 3/2011 |

(Continued)

*Primary Examiner* — James A Thompson
(74) *Attorney, Agent, or Firm* — Paratus Law Group, PLLC

(57) ABSTRACT

According to the present disclosure, there is provided an image processing apparatus including a depth determination unit that determines a reference depth of a stereoscopic view image disposed in a display region of content, and a depth changing unit that changes a depth of at least a part of the stereoscopic view image such that a depth of the display region of the content coincides with the determined reference depth.

18 Claims, 15 Drawing Sheets

(56) References Cited

U.S. PATENT DOCUMENTS

| | | | | |
|---|---|---|---|---|
| 2013/0010077 A1* | 1/2013 | Nguyen | ............... | H04N 13/026 348/46 |
| 2013/0069934 A1* | 3/2013 | Wang | ................. | H04N 13/0022 345/419 |
| 2013/0076872 A1* | 3/2013 | Wang | .................... | H04N 13/04 348/51 |
| 2013/0222377 A1* | 8/2013 | Bruls | ...................... | G06T 15/00 345/419 |

FOREIGN PATENT DOCUMENTS

| | | |
|---|---|---|
| WO | WO2004/056133 | 7/2004 |
| WO | WO2011/052389 | 5/2011 |
| WO | WO2011/086932 | 7/2011 |

* cited by examiner

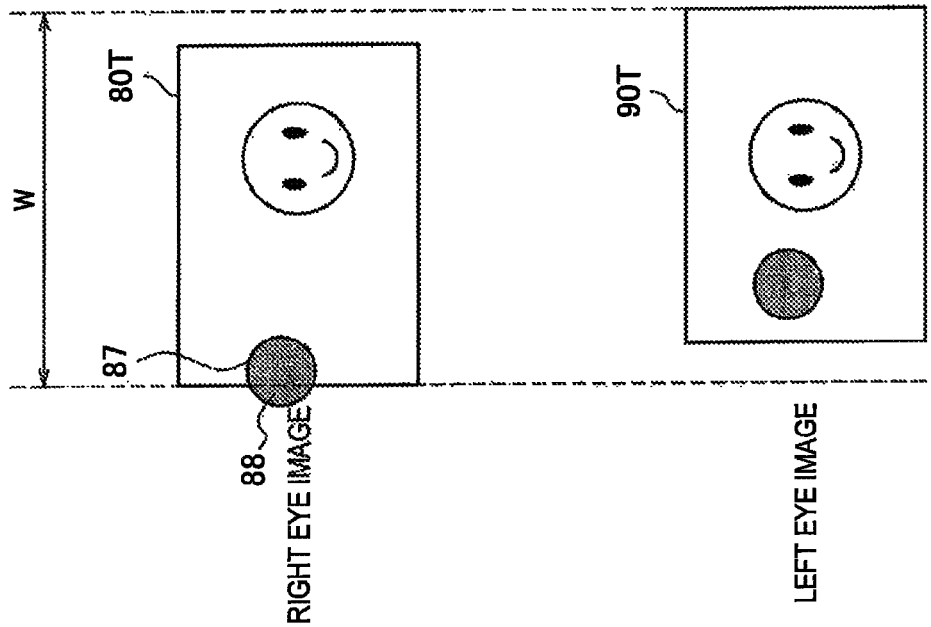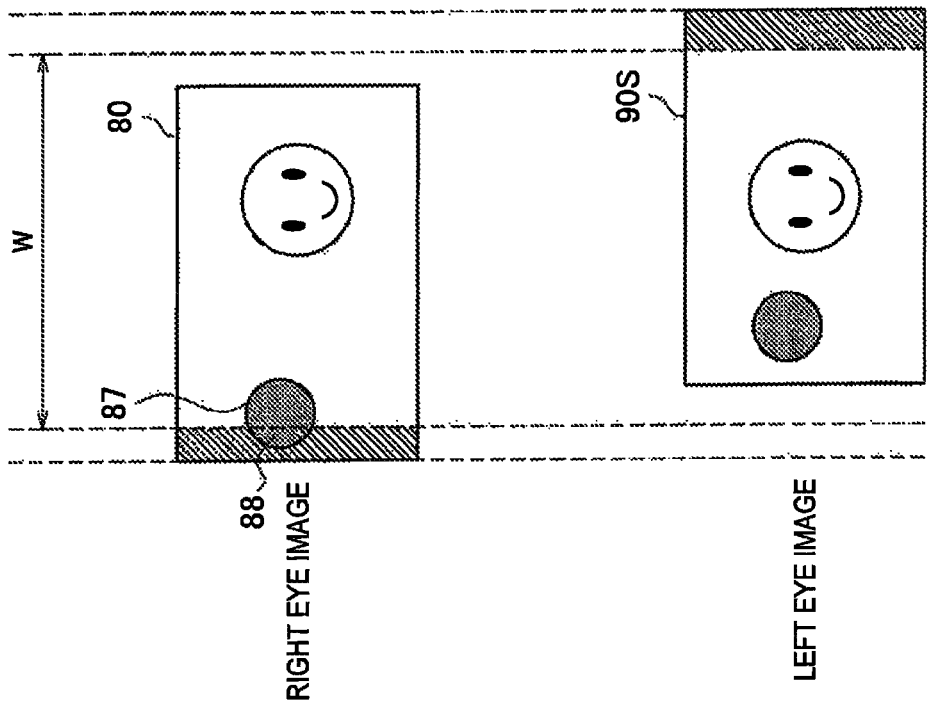
FIG. 11

IMAGE PROCESSING APPARATUS, IMAGE PROCESSING METHOD AND PROGRAM

CROSS REFERENCE TO PRIOR APPLICATION

This application is a National Stage Patent Application of PCT International Patent Application No. PCT/JP2012/073034 (filed on Sep. 10, 2012) under 35 U.S.C. § 371, which claims priority to Japanese Patent Application No. 2011-226660 (filed on Oct. 14, 2011), which are all hereby incorporated by reference in their entirety.

TECHNICAL FIELD

The present disclosure relates to an image processing apparatus, an image processing method and a program.

BACKGROUND ART

Recent years, three-dimensional displays are widely known for providing stereoscopic vision to the viewer. In the relevant three-dimensional displays, a stereoscopic view image is displayed as a combination of a left eye image and a right eye image, and thereby, the both eyes of the viewer are led to parallax. As a result, the viewer perceives a pop-out or a pull-in for a part of or the entirety of the stereoscopic view image.

While enabling a wider expression than a planar image, the stereoscopic view image puts burden on the eyes of the viewer. Hence, there is also a technology in which display of the stereoscopic view image is controlled so as not to put the burden on the eyes of the viewer.

For example, Patent Literature 1 discloses a technology in which the depth of the stereoscopic view image is changed according to operations of the viewer of the stereoscopic view image. Thereby, stereoscopic display suitable for the viewer is possible.

CITATION LIST

Patent Literature

Patent Literature 1: JP 2007-37619A

SUMMARY OF INVENTION

Technical Problem

However, according to the technology of Patent Literature 1 mentioned above, although the depth of the stereoscopic view image can be adjusted according to operations of the viewer in a beforehand defined stage, the depth of the stereoscopic view image cannot be adjusted automatically such that the burden on the eyes of the viewer becomes less. For example, when stereoscopic view images are disposed in a display region of content as in a Web page, according to the technology of Patent Literature 1 mentioned above, the viewer must adjust, with the operations, the depths of all the relevant stereoscopic view images collectively or the individual stereoscopic view images separately to decide the proper depths. Hence, a trouble of the adjustment occurs for every occasion of viewing, and in addition, it is difficult to perform proper adjustment of the depths such that the burden on the eyes becomes less.

Therefore, in the present disclosure, novel and improved image processing apparatus, image processing and program are proposed to enable to adjust a depth of a stereoscopic view image automatically such that burden on the eyes of the viewer of content becomes less.

Solution to Problem

According to the present disclosure, there is provided an image processing apparatus including a depth determination unit that determines a reference depth of a stereoscopic view image disposed in a display region of content, and a depth changing unit that changes a depth of at least a part of the stereoscopic view image such that a depth of the display region of the content coincides with the determined reference depth.

According to the present disclosure, there is provided an image processing method including determining a reference depth of a stereoscopic view image disposed in a display region of content, and changing a depth of at least a part of the stereoscopic view image such that a depth of the display region of the content coincides with the determined reference depth.

According to the present disclosure, there is provided a program for causing a computer to function as a depth determination unit that determines a reference depth of a stereoscopic view image disposed in a display region of content, and a depth changing unit that changes a depth of at least a part of the stereoscopic view image such that a depth of the display region of the content coincides with the determined reference depth.

Advantageous Effects of Invention

According to the image processing apparatus, the image processing method and the program according to the present disclosure, it is enabled to adjust a depth of a stereoscopic view image automatically such that burden on the eyes of the viewer of content becomes less.

BRIEF DESCRIPTION OF DRAWINGS

FIG. 11 is an explanatory drawing for explaining a second example of trimming the stereoscopic view image after the shifting.

DESCRIPTION OF EMBODIMENTS

Hereinafter, preferred embodiments of the present disclosure will be described in detail with reference to the appended drawings. Note that, in this specification and drawings, elements that have substantially the same function and structure are denoted with the same reference signs, and repeated explanation is omitted.

Incidentally, the description is made in the following order.
1. Introduction
2. Configuration of Image Processing Apparatus
   2.1. Logical Configuration of Image Processing Apparatus
   2.2. Hardware Configuration of Image Processing Apparatus
3. Flow of Processing
4. Summary
   <1. Introduction>

First, referring to FIG. 1 to FIG. 4, one example of content according to the embodiment and a problem of displaying the relevant content in the conventional art are described.

(Content According to Embodiment)

Figure 1:
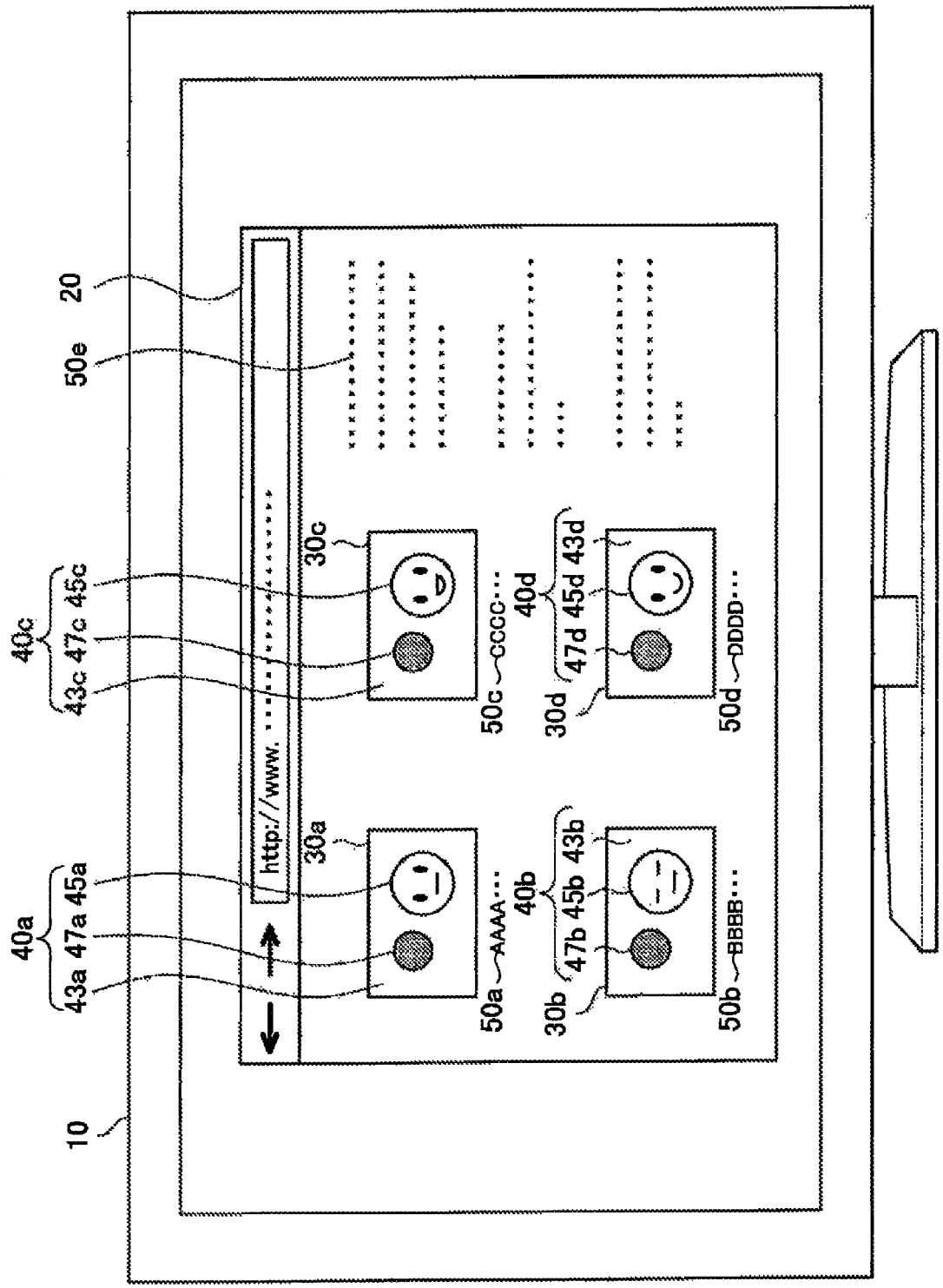
FIG. 1 is an explanatory drawing for explaining one example of content according to an embodiment of the present disclosure.

One example of content according to the embodiment is described with reference to FIG. 1. FIG. 1 is an explanatory drawing for explaining one example of content according to the embodiment. Referring to FIG. 1, the content is displayed on a content display region 20 in a screen of a display apparatus 10. Herein, the relevant content is, for example, a Web page in HTML format. Moreover, the display apparatus 10 is a three-dimensional display that provides stereoscopic vision to the viewer. Moreover, the content display region 20 is, for example, a display region of a Web browser in the screen of the display apparatus 10 when the content is a Web page in HTML format.

The content display region 20 has a predetermined depth. The relevant depth is an extent of a pop-out or a pull-in, which is perceived by the viewer, from/into the screen as to the viewing target. More specifically, in the embodiment, the depth is a numerical value, for example, indicating a pop-out amount from the screen when being a positive number and its absolute number indicates a pull-in amount into the screen when being a negative number. The depth of the content display region 20 is, for example, 0. Namely, the content display region 20 is not displayed stereoscopically but is perceived to be on the screen of the display apparatus 10.

Moreover, the content contains stereoscopic view images 40. The stereoscopic view images 40 are, for example, stereoscopic view images in stereo JPEG (JPS) format, stereo PNG (PNS) format or the like. The stereoscopic view images 40 are disposed in display sections 30 for the stereoscopic view images 40 within the content display region 20. For example, referring to FIG. 1, stereoscopic view images 40a, 40b, 40c and 40d are disposed in respective display sections 30a, 30b, 30c and 30d within the content display region 20.

Moreover, the stereoscopic view image 40 is a stereoscopic view image having a single depth or a stereoscopic view image containing a plurality of parts having different depths. Referring to FIG. 1, for example, the stereoscopic view image 40 contains a background part 43, a face part 45 and an object part 47. Furthermore, the depth of the background part 43 is same as the depth of the face part 45 and the depth of the object part 47 is different from the depths of the background part 43 and the face part 45.

Moreover, for example, the content also contains objects other than the stereoscopic view image. The relevant objects are, for example, text characters 50. The text characters 50 are disposed in the content display region 20. Moreover, the depth of the text characters 50 is same as the depth of the content display region 20.

In addition, the content may be other content containing the stereoscopic view image 40, for example, of an electronic book, an electronic document, an electronic album, a slide, a game screen or the like. Moreover, the content display region 20 also may be an application screen, a desktop screen or the like. Moreover, the stereoscopic view image 40 may be a still image or may be a moving image. Moreover, the display apparatus 10 is not limited to the display apparatus of any stereoscopic view system, but may be a display apparatus of any of stereoscopic view systems including an eyeglass system such as a liquid crystal shutter and a polarizing filter and a naked-eye system such as a lenticular one and a parallax barrier.

(Problem in Displaying Content)

Figure 2:
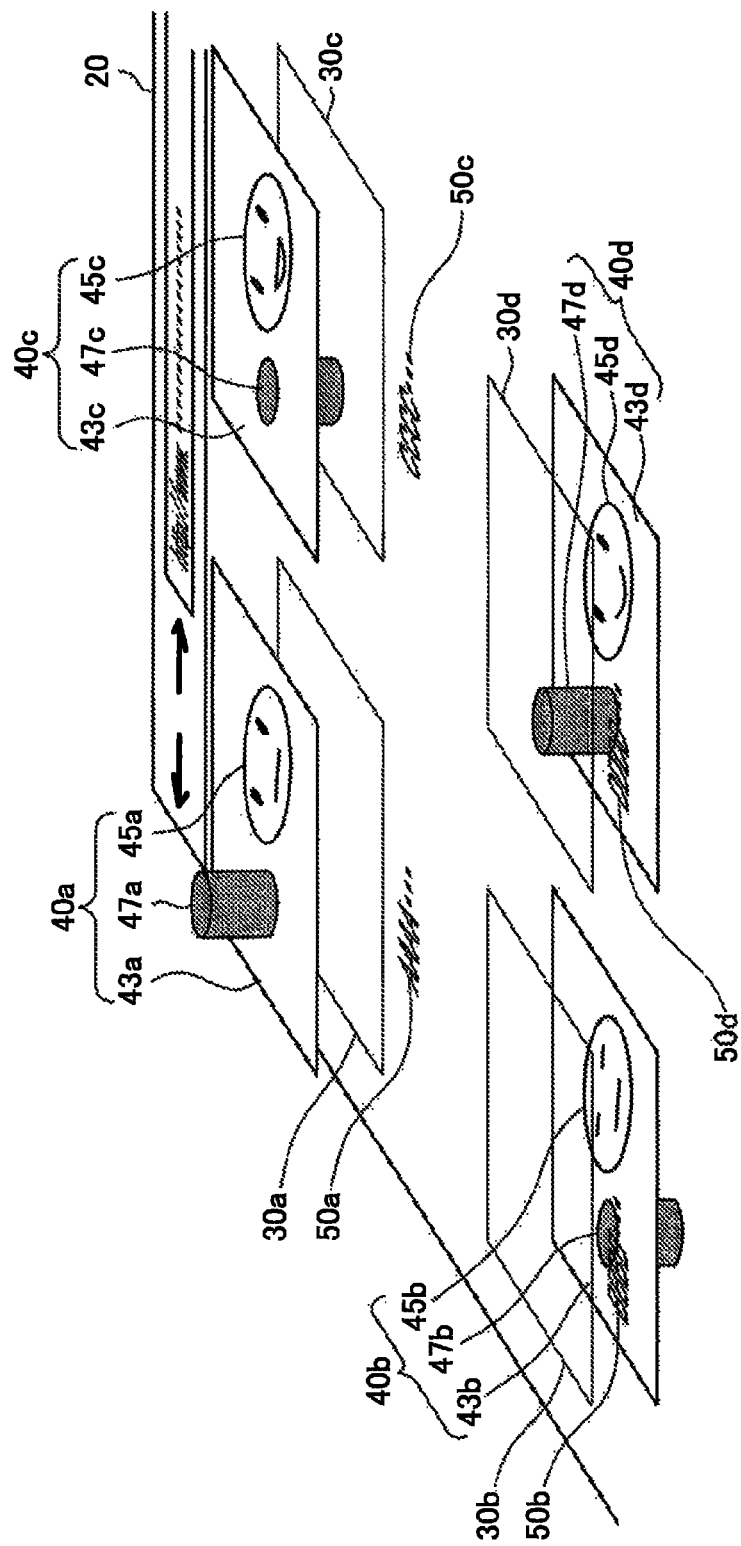
FIG. 2 is an explanatory drawing for explaining one example of displaying the content in the conventional art.
Figure 3:
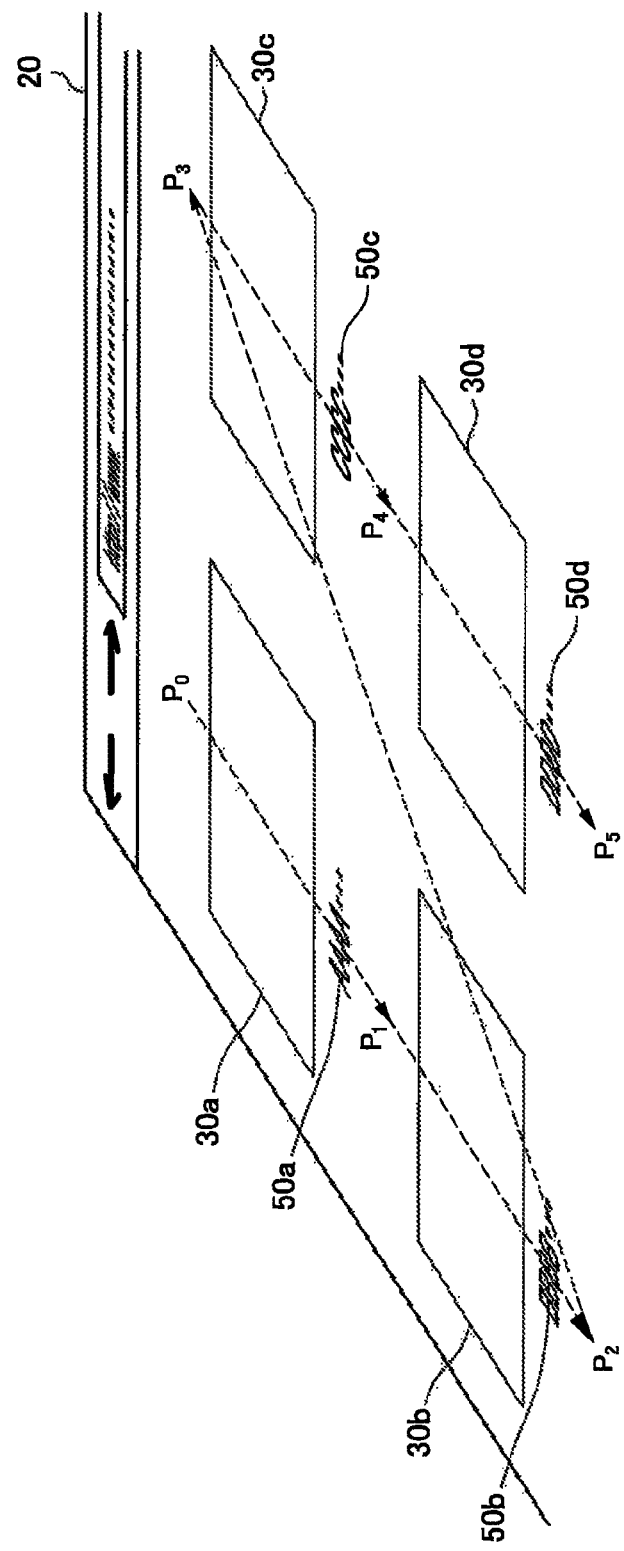
FIG. 3 is an explanatory drawing for explaining one example of view point movement in viewing the content.
Figure 4:
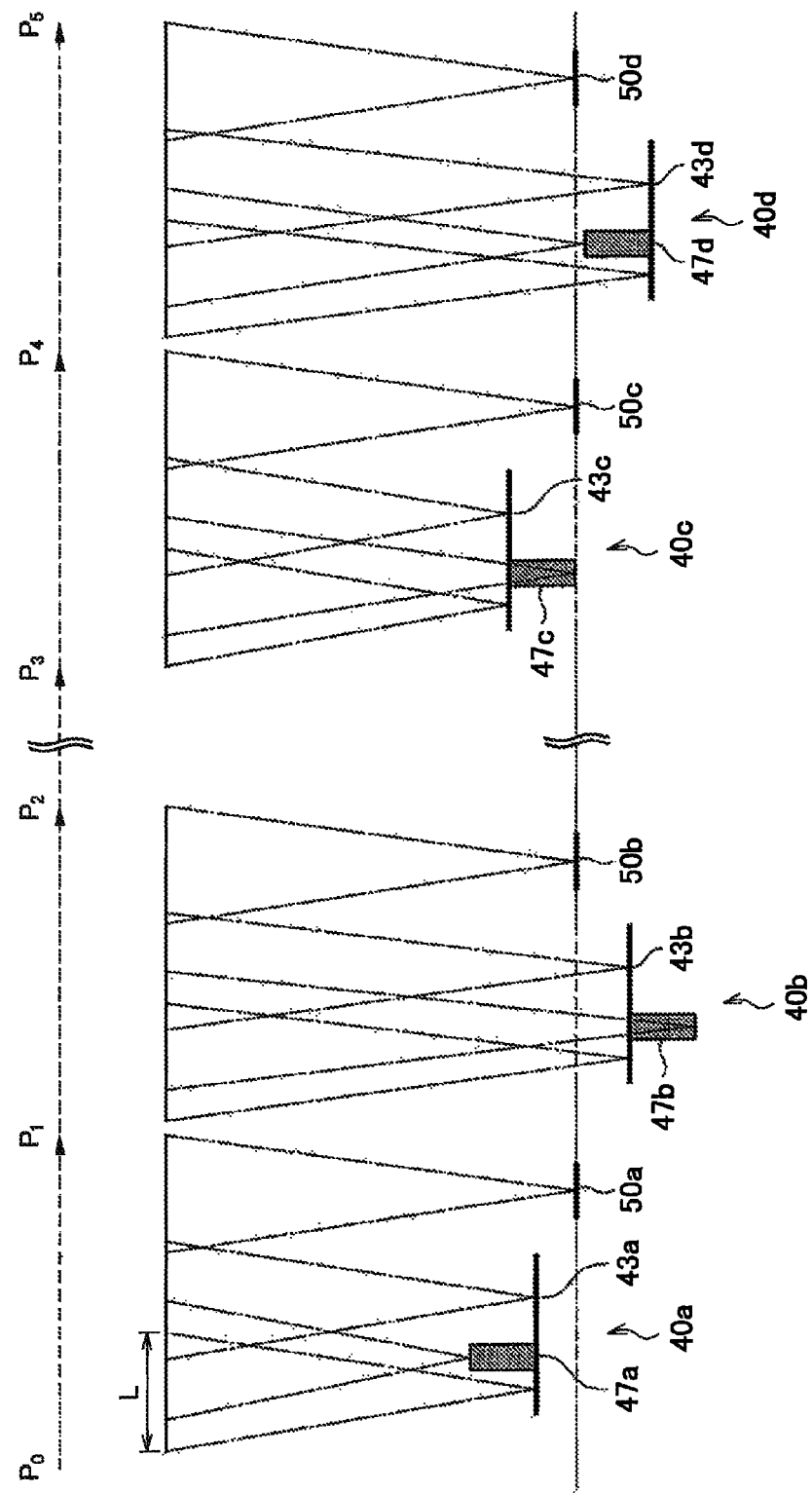
FIG. 4 is an explanatory drawing for explaining one example of converging fluctuation in viewing the content in the conventional art.

Next, referring to FIG. 2 to FIG. 4, a problem of displaying content in the conventional art is described. FIG. 2 is an explanatory drawing for explaining one example of displaying content in the conventional art. FIG. 2 illustrates imagery of how much depths the viewer perceives for the stereoscopic view images 40 illustrated in FIG. 1 which are displayed according to the conventional art. Referring to FIG. 2, for example, the depths of the background part 43a and the face part 45a in the stereoscopic view image 40a are larger than the depth of the content display region 20. Moreover, the depth of the object part 45a is further larger than the depths of the background part 43a and the face part 45a. As above, in the stereoscopic view image 40, the depths of the background part 43 and the face part 45 are different from the depth of the content display region 20, and furthermore, the depth of the object part 45 is different from the depths of the background part 43 and the face part 45. As above, parts having various depths exist in the content display region 20.

FIG. 3 is an explanatory drawing for explaining one example of view point movement in viewing the content. Referring to FIG. 3, the viewer moves the view point, for example, to pass points $P_0$, $P_1$, $P_2$, $P_3$, $P_4$ and $P_5$ sequentially in the content display region 20. In this case, the viewer views the stereoscopic view image 40a and text characters 50a disposed in the display section 30a from $P_0$ to $P_1$ and views the stereoscopic view image 40b and text characters 50b disposed in the display section 30b from $P_1$ to $P_2$. Similarly, also from $P_3$ to $P_4$ and from $P_4$ to $P_5$, the viewer views the stereoscopic view images 40c and 40d and text characters 50c and 50d.

FIG. 4 is an explanatory drawing for explaining one example of converging fluctuation in viewing the content in the conventional art. Referring to FIG. 4, when the view point moves to pass the points $P_0$ to $P_5$ illustrated in FIG. 3 sequentially, the both eyes of the viewer whose pupils' distance is L perform converging and diverging movement. Namely, the both eyes of the viewer perform converging movement for which the both eyes are oriented more to the inside or perform diverging movement for which the both eyes are oriented more to the outside for focusing on the viewing targets. For example, from the point $P_0$ to $P_1$, the both eyes of the viewer perform converging movement for moving the view point from the background part 43*a* to the object part 47*a*, and after that, perform diverging movement for moving it from the object part 47*a* to the background part 43*a* in the stereoscopic view image 40*a*. Furthermore, the both eyes of the viewer perform diverging movement for moving the view point from the background part 43*a* to the text characters 50*a* of the stereoscopic view image 40*a*. As above, when moving the view point to pass $P_0$ to $P_5$ sequentially, the both eyes of the viewer perform converging and diverging movement frequently.

As mentioned above, according to displaying content in the conventional art, since the both eyes of the viewer perform converging and diverging movement frequently, the both eyes of the viewer suffer significant burden.

Furthermore, according to displaying content in the conventional art, vergence accommodation conflict also occurs frequently. Describing more in detail, in addition to the converging and diverging movement, the viewer performs adjustment for focusing as to the both eyes' lenses when viewing the screen of the display apparatus 10. Furthermore, stereoscopic view functions of the human include a function called convergence accommodation by which the adjustment is led to the depth position perceived due to the converging. However, since the stereoscopic view image 40 is actually displayed on the screen as the left eye image and the right eye image, the both eyes of the viewer focus on the position on the screen of the display apparatus 10 not on the depth position perceived due to the converging. Hence, the converging and the adjustment contradict each other. As a result, the both eyes of the viewer suffer burden.

Therefore, according to the embodiment, it is enabled that the depth of the stereoscopic view image 40 is automatically adjusted such that burden on the eyes of the viewer caused by the converging and diverging movement and the vergence accommodation conflict is made less. Hereafter, the specific contents is described in <2. Configuration of Image Processing Apparatus> and <3. Flow of Processing>.

<2. Configuration of Image Processing Apparatus>

First, referring to FIG. 5 to FIG. 14, a configuration of an image processing apparatus 100 according to the embodiment is described.

[2.1 Logical Configuration]

Figure 5:
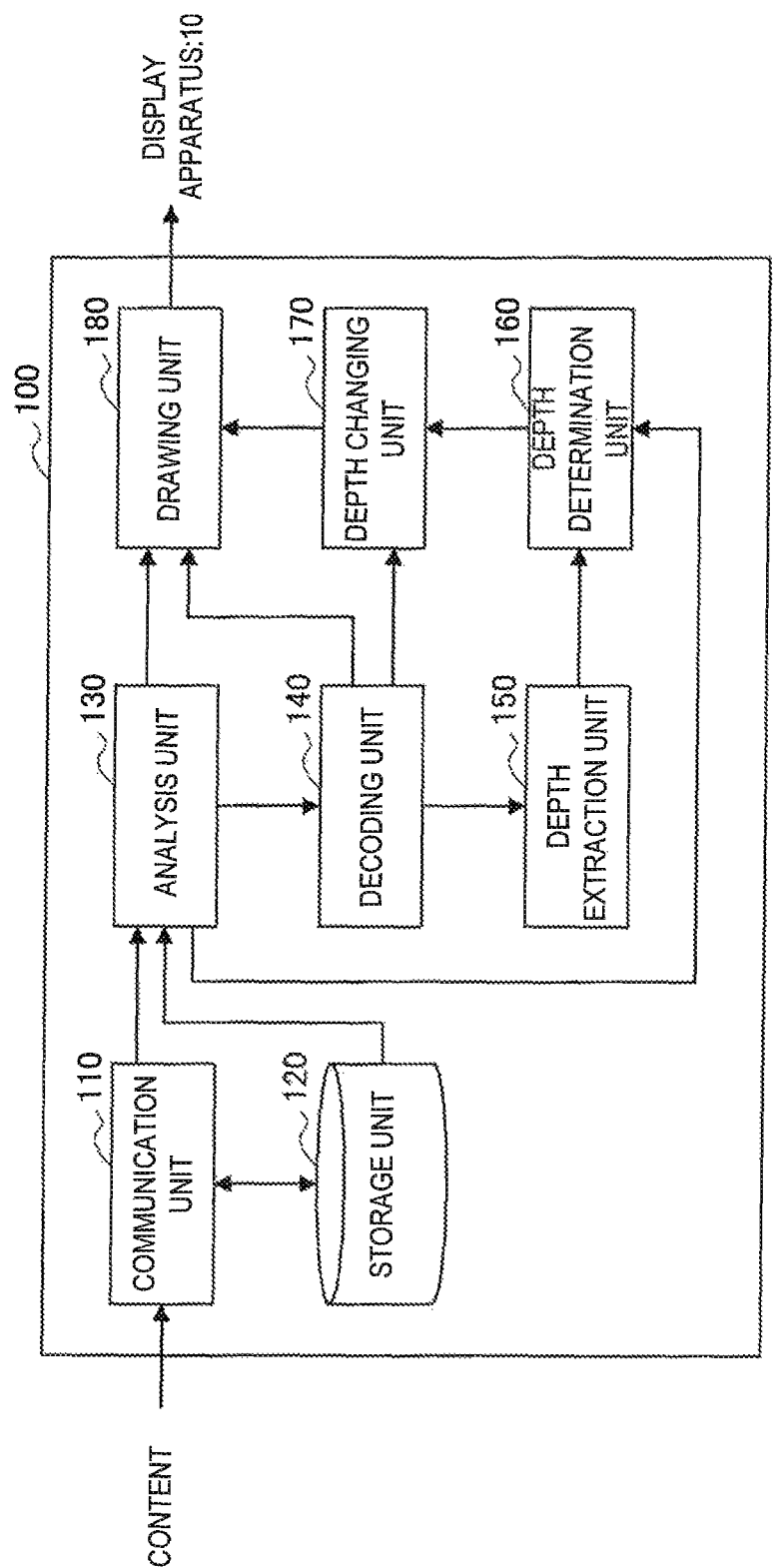
FIG. 5 is a block diagram illustrating one example of a logical configuration of an image processing apparatus according to the embodiment.

Herein, referring to FIG. 5 to FIG. 13, a logical configuration of the image processing apparatus 100 according to the embodiment is described. FIG. 5 is a block diagram illustrating one example of a logical configuration of the image processing apparatus 100 according to the embodiment. Referring to FIG. 5, the image processing apparatus 100 includes a communication unit 110, a storage unit 120, an analysis unit 130, a decoding unit 140, a depth extraction unit 150, a depth determination unit 160, a depth changing unit 170 and a drawing unit 180. Herein, the analysis unit 120 is one example of an acquisition unit.

(Communication Unit 110)

The communication unit 110 communicates with other apparatuses via a network. For example, the communication unit 110 receives content which is displayed on a screen of a display apparatus 10 from another apparatus. More specifically, for example, when the content is a Web page in HTML format, the communication unit 110 receives data of the Web page including an HTML document, the stereoscopic view image 40 and the like from a Web server. Then, the communication unit 110 outputs the received data of the content to the analysis unit 130.

(Storage Unit 120)

The storage unit 120 stores information to be temporarily or permanently held in the image processing apparatus 100. For example, the storage unit 120 stores the data of the content which is displayed on the screen of the display apparatus 10.

(Analysis Unit 130)

The analysis unit 130 analyzes the content which is displayed on the screen of the display apparatus 10. For example, the analysis unit 130 first acquires the content outputted by the communication unit 110 or acquires the content stored in the storage unit 120. Next, the analysis unit 130 analyzes the acquired content. Herein, the analysis unit 130 acquires the stereoscopic view image 40 contained in the content. Then, the analysis unit 130 outputs the acquired stereoscopic view image 40 to the decoding unit 140.

Herein, the acquisition of the stereoscopic view image 40 is described more specifically. For example, when the content is a Web page in HTML format, the analysis unit 130 acquires the stereoscopic view image 40, utilizing a document object model (hereinafter referred to as DOM) of the content. Namely, upon acquisition of an HTML document, the analysis unit 130 expands the relevant HTML document into a tree structure, utilizing the document object model. Next, the analysis unit 130 refers to the relevant tree structure to specify the stereoscopic view image 40 in stereo JPEG (JPS) format, stereo PNG (PNS) format or the like. Then, the analysis unit 130 acquires the stereoscopic view image 40 contained in the Web page. When the content is a Web page in HTML format as above, the analysis unit 130 is implemented, for example, of an HTML parser.

In addition, the analysis unit 130 acquires, for example, a planar image contained in the content as well and outputs it to the decoding unit 140. Moreover, the analysis unit 130 outputs objects other than images in the content to the drawing unit 180. Moreover, when a depth of the content display region 20 is configured on a content-by-content basis, the analysis unit 130 acquires information of the depth of the relevant content display region 20 as well and outputs the relevant information of the depth to the depth determination unit 160.

(Decoding Unit 140)

The decoding unit 140 decodes the stereoscopic view image 40. For example, the decoding unit 140 first acquires the stereoscopic view image 40 outputted by the analysis unit 130. Next, the analysis unit 130 identifies the format of the relevant stereoscopic view image 40 and reconstructs the relevant stereoscopic view image 40 compressed according to the format. Next, the decoding unit 140 divides the reconstructed stereoscopic view image 40 into a left eye image and a right eye image. Then, the decoding unit 140 outputs the left eye image and the right eye image to the depth extraction unit 150. In addition, the decoding unit 140 decodes the planar image as well and outputs it to the drawing unit 180.

(Depth Extraction Unit 150)

The depth extraction unit 150 extracts depths in the stereoscopic view image 40 from the left eye image and the right eye image of the stereoscopic view image 40. For example, the depth extraction unit 150 acquires the left eye image and the right eye image of the stereoscopic view image 40 outputted by the decoding unit 140. Next, the depth extraction unit 150 measures displacements in the horizontal direction between the relevant left eye image and right eye image using stereo matching. The relevant displacements in the horizontal direction are measured in units of pixels or in units of predetermined pixel groups. Furthermore, the depth extraction unit 150 specifies the depths in the stereoscopic view image 40 on the basis of widths of the displacements in the horizontal direction. Then, the depth extraction unit 150 outputs the depths in the stereoscopic view image 40 which are thus extracted to the depth determination unit 160.

Herein, the depth extraction unit 150 outputs, for example, the extracted depths in the stereoscopic view image 40 in a format of a depth map. The relevant depth map is an image in which the depth in the stereoscopic view image 40 is represented in monochrome gradations. As one example, when displayed on the screen, the depth map represents a part with a larger depth (that is, with a more pop-out) by a color closer to white and represents a part with a smaller depth (that is, with a more pull-in) by a color closer to black. Hereafter, as to the extraction of the depths in the stereoscopic view image 40, its specific example is described with reference to FIG. 6.

Figure 6:
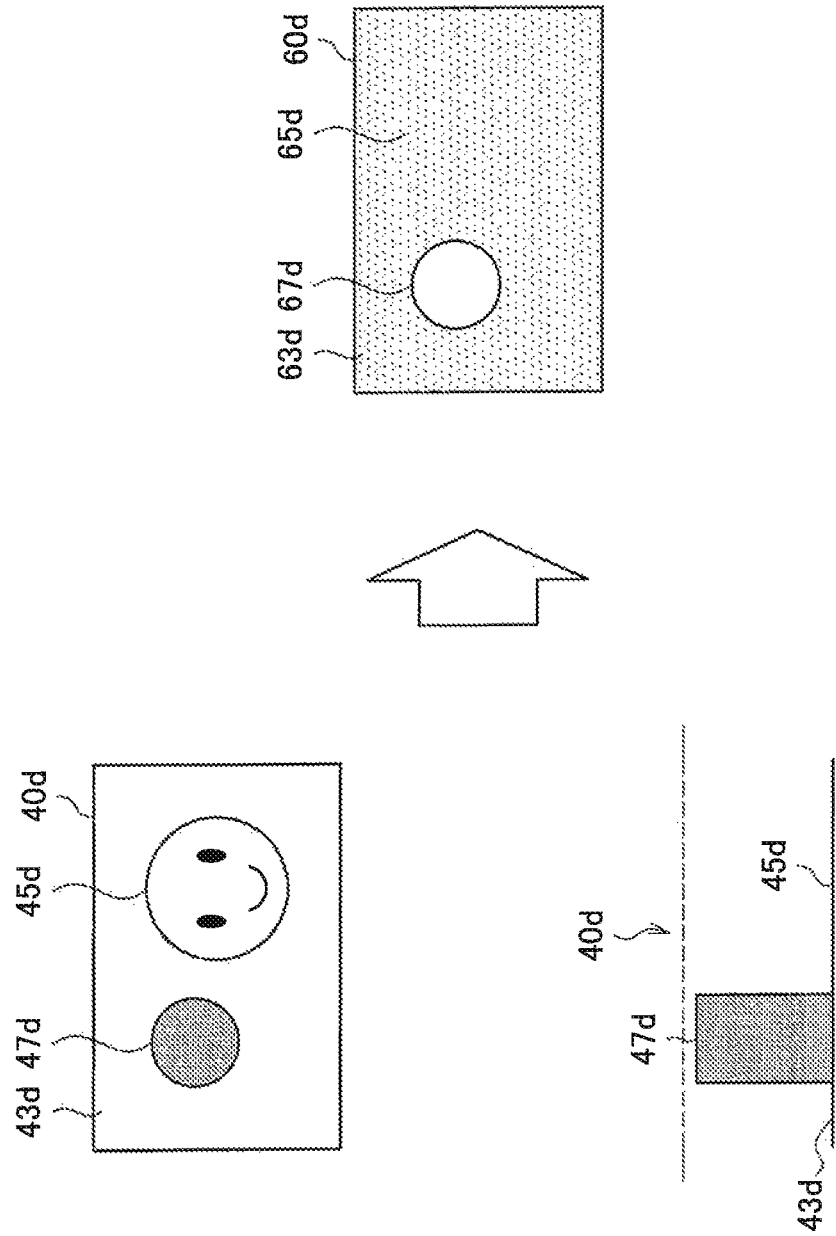
FIG. 6 is an explanatory drawing for explaining one example of extraction results of depths in a stereoscopic view image.

FIG. 6 is an explanatory drawing for explaining one example of extraction result of depths in the stereoscopic view image 40. Referring to FIG. 6, for example, the depth of a background part 43d is same as the depth of a face part 45d in a stereoscopic view image 40d and is smaller than the depth of the content display region 20. Moreover, the depth of an object part 45a is larger than the depths of the background part 43a and the face part 45a. Accordingly, in a depth map 60d of the stereoscopic view image 40d, a part 63d and a part 65d corresponding to the background part 43d and the face part 45d are represented by a color closer to black. Moreover, a part 67d corresponding to the object part 47d is represented by a color closer to white.

(Depth Determination Unit 160)

The depth determination unit 160 determines a reference depth of the stereoscopic view image 40 disposed in the display region 20 of the content. The relevant reference depth is a depth of a part contained in the stereoscopic view image 40 or a depth close to the relevant depth.

For example, the depth determination unit 160 determines the above-mentioned reference depth on the basis of pixel numbers for the individual depths in the stereoscopic view image 40. For example, the depth determination unit 160 first acquires the depth map of the stereoscopic view image 40 outputted by the depth extraction unit 150 and counts the pixel numbers for the individual depths in the relevant depth map. Then, the depth determination unit 160 determines the reference depth such that the depths of more pixels are closer to the reference depth. A specific example of the determination of the relevant reference depth is described with reference to FIG. 7.

Figure 7:
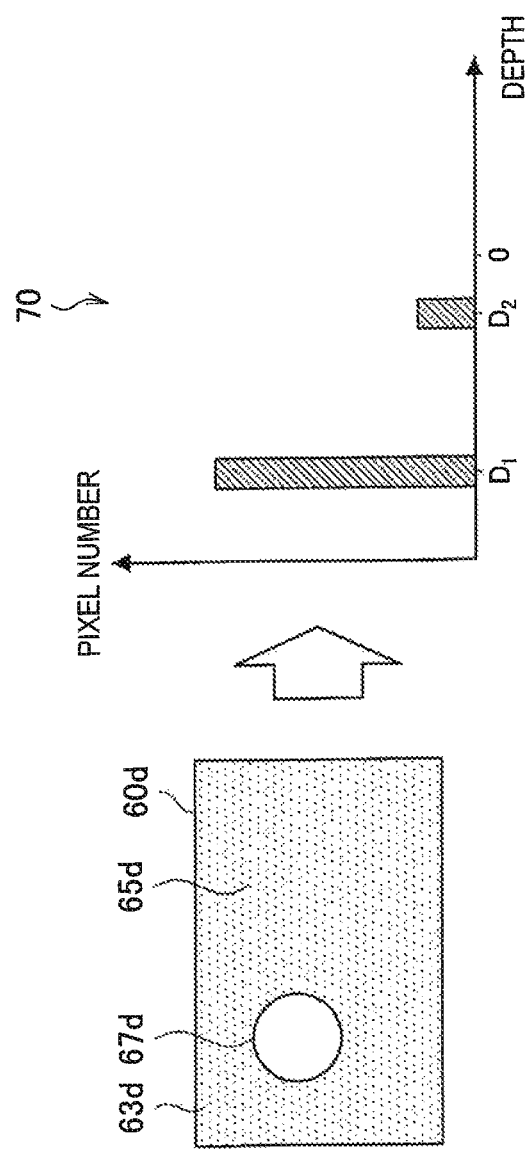
FIG. 7 is an explanatory drawing for explaining one example of pixel numbers for individual depths.

FIG. 7 is an explanatory drawing for explaining one example of pixel numbers for individual depths. Referring to FIG. 7, the depth map 60d of the stereoscopic view image 40d illustrated in FIG. 6 is presented. The relevant depth map 60d includes the parts 63d and 65d having a smaller depth $D_1$ and the part 67d having a larger depth $D_2$. The depth determination unit 160 counts the pixel numbers for the individual depths in the relevant depth map 60d. As a result, a number of pixels are counted for the depth $D_1$ and less number of pixels are counted for the depth $D_2$. These count results of the pixel numbers for the individual depths are presented as in a histogram 70. On the basis of the relevant pixel numbers for the individual depths, the depth determination unit 160 determines, for example, the depth $D_1$ for which the number of pixels is highest, as the reference depth. Namely, the depth determination unit 160 determines the depth same as the depths of the background part 43d and the face part 45d in the stereoscopic view image 40d as the reference depth. In addition, the depth determination unit 160 may specify the highest one in pixel number out of depths with predetermined widths (for example, $D_m$ to $D_n$) and determine any depth within the specified depth with the predetermined width as the reference depth, not determining the highest one in pixel number out of the single depths as the reference depth. Moreover, the depth determination unit 160 may determine the weighted average of the depths with the pixel numbers being the weight as the reference depth.

As above, employing pixel numbers for individual depths, a reference depth close to depths of more parts in the stereoscopic view image 40 can be obtained. In other words, parts having the same depth as or a close depth to the reference depth in the stereoscopic view image 40 can be made more.

In addition, instead of the determination of the reference depth on the basis of pixel numbers of individual depths, the depth determination unit 160 may determine the above-mentioned reference depth on the basis of the largest depth and the smallest depth out of pixel numbers of individual depths in the stereoscopic view image 40. More specifically, for example, the depth determination unit 160 acquires a depth map of the stereoscopic view image 40 outputted by the depth extraction unit 150 and specifies the largest depth and the smallest depth from the relevant depth map. Then, the depth determination unit 160 may determine any depth between the largest depth and the smallest depth, for example, the average depth of the largest depth and the smallest depth as the reference depth.

As above, determining the reference depth on the basis of the largest depth or the smallest depth, when depths in the stereoscopic view image 40 have a dispersion, a depth close to the depths of parts contained in the stereoscopic view image 40 can be estimated. Moreover, such simple estimation can reduce processing amount for the determination of the reference depth.

Moreover, the above-mentioned pixels for the determination of the reference depth may be, for example, pixels contained in the edge part of the above-mentioned stereoscopic view image 40. Namely, the depth extraction unit 150 determines the reference depth, for example, not on the basis of the pixels over the whole stereoscopic view image 40 but on the basis of pixels contained in the edge part of the stereoscopic view image 40. A specific example of the relevant edge part is described with reference to FIG. 8.

Figure 8:
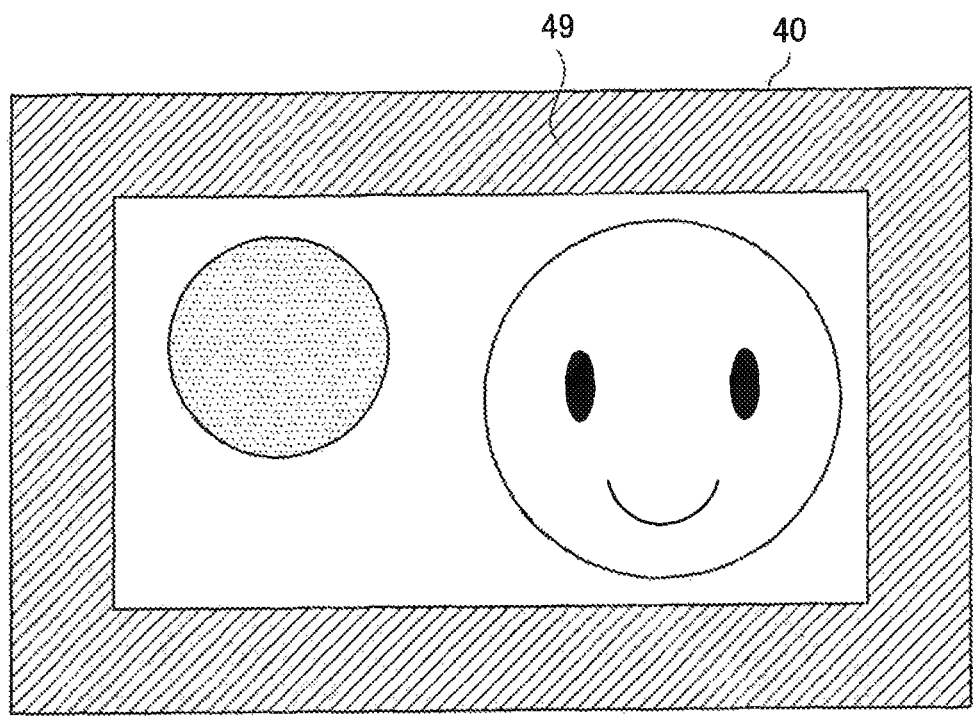
FIG. 8 is an explanatory drawing for explaining one example of a pixel range utilized for determining a reference depth.

FIG. 8 is an explanatory drawing for explaining one example of a range of pixels utilized for the determination of the reference depth. Referring to FIG. 8, an edge part 49 of the stereoscopic view image 40 is, for example, a range having predetermined widths from individual sides of the top, bottom, right and left of the stereoscopic view image 40. In this case, the depth determination unit 160 counts, for example, pixel numbers for individual depths out of the pixels contained in the edge part 49, or specifies the largest depth and the smallest depth therefrom. Then, the depth determination unit 160 determines the reference depth on the basis of the relevant pixel numbers for the individual depths or the largest depth and the smallest depth.

As above, employing pixels contained in the edge part of the stereoscopic view image 40 but not the pixels over the whole stereoscopic view image 40, a reference depth close to a depth of a part positioning continuously to the content display region 20 can be obtained. In other words, the depth of a part positioning continuously to the content display region 20 is a depth close to the reference depth.

As described above, the depth determination unit 160 determines the reference depth. Then the depth determination unit 160 outputs the determined reference depth to the depth changing unit 170.

Moreover, the depth determination unit 160 also determines, for example, a depth of the content display region 20. For example, the depth determination unit 160 first acquires information of the depth of the content display region 20 outputted by the analysis unit 130. Then, the depth determination unit 160 determines the depth of the content display region 20 to be the depth indicated by the acquired information. Moreover, when the depth of the content display region 20 is not configured in the content, the depth determination unit 160 determines the depth of the content display region 20 to be a predetermined depth (for example, 0). Then, the depth determination unit 160 outputs the determined depth of the content display region 20 to the depth changing unit 170.

(Depth Changing Unit 170)

The depth changing unit 170 changes a depth of at least part of the stereoscopic view image 40 such that the depth of the display region 20 of the content coincides with the above-mentioned determined reference depth. Namely, the depth changing unit 170 changes the depth of the stereoscopic view image 40 by a difference between the reference depth of the stereoscopic view image 40 and the content display region 20. Thereby, for example, when the reference depth is larger than the depth of the content display region 20, the depth of the stereoscopic view image 40 is decreased by the above-mentioned difference. Moreover, for example, when the reference depth is smaller than the depth of the content display region 20, the depth of the stereoscopic view image 40 is increased by the above-mentioned difference. Such change in depth allows perception of a part at the same depth as or a close depth to the reference depth in the stereoscopic view image 40 (hereinafter referred to as "reference depth part") to be at the same depth as or a close depth to that of the content display region 20. Herein, an example in which the depth of the content display region 20 is 0 is described. In addition, in the embodiment, the depth changing unit 170 basically changes the depth over the whole stereoscopic view image 40. It should be noted that the depth changing unit 170 may change only part of the stereoscopic view image 40 but not the entirety thereof.

More specifically, the depth changing unit 170 shifts the left eye image or the right eye image of the stereoscopic view image 40 in a right/left direction, and thereby, changes the depth of the stereoscopic view image 40. Namely, supposing that the depth of the content display region 20 is 0, the depth changing unit 170 shifts the left eye image and the right eye image such that, as to the reference depth part in the stereoscopic view image 40, its position in the left eye image coincides with or comes closer to its position in the right eye image. A specific example of the relevant shift is described with reference to FIG. 9.

Figure 9:
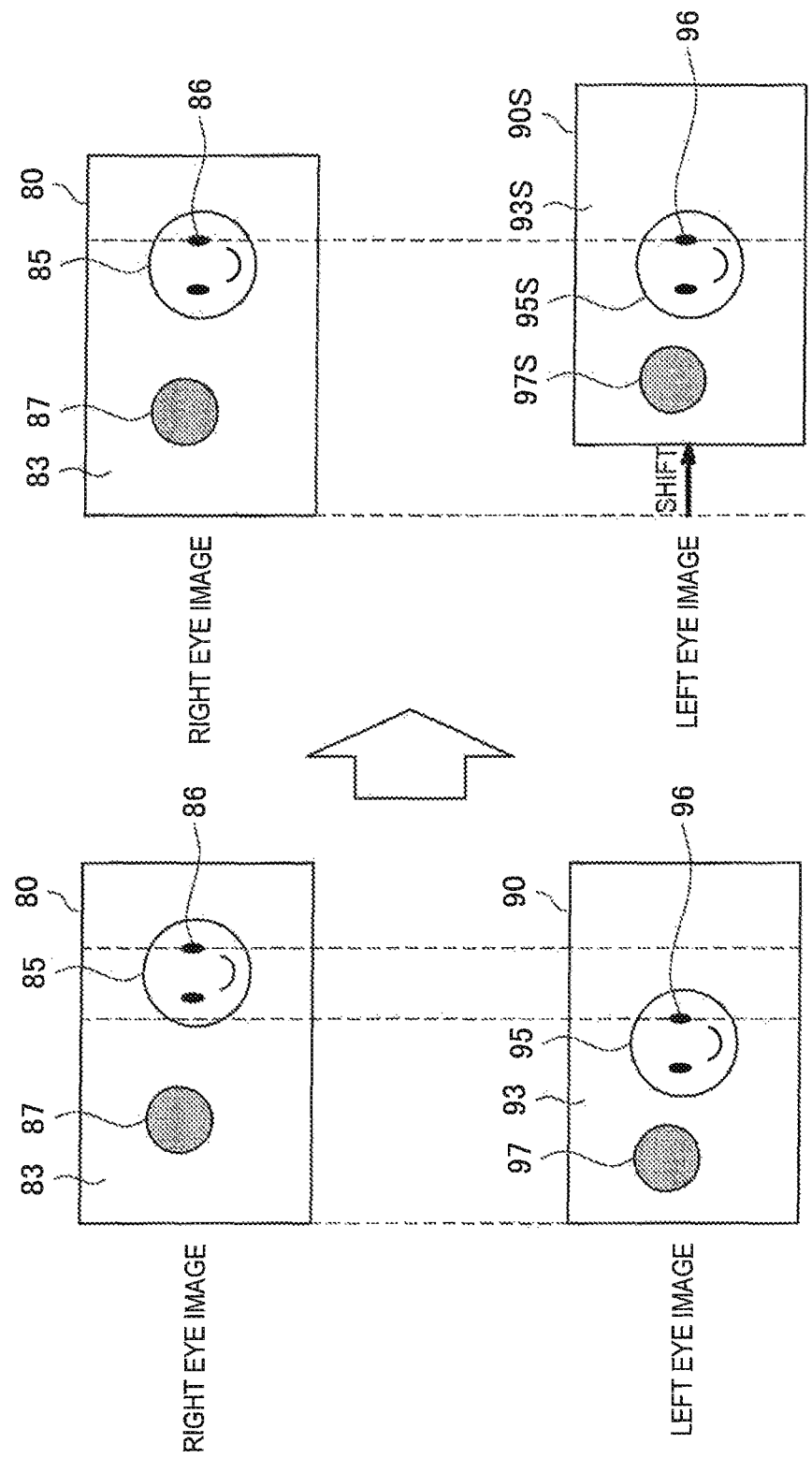
FIG. 9 is an explanatory drawing for explaining one example of change in depth of the stereoscopic view image due to shifting.

FIG. 9 is an explanatory drawing for explaining one example of change in depth of the stereoscopic view image 40 by shifting. Referring to FIG. 9, a right eye image 80 and a left eye image 90 of the stereoscopic view image 40 are presented. In this example, the relevant stereoscopic view image 40 is the stereoscopic view image 40d illustrated in FIG. 6 and FIG. 7. As described with reference to FIG. 7, the depths of the background part 43d and the face part 45d in the stereoscopic view image 40d are determined as the reference depth. Namely, the reference depth part in the stereoscopic view image 40d includes the background part 43d and the face part 45d. Furthermore, the relevant background part 43d and face part 45d correspond to a right eye background part 83 and a right eye face part 85 in a right eye image 80 and correspond to a left eye background part 93 and a left eye face part 95 in a left eye image 90.

In this case, the depth changing unit 170 specifies, for example, a position 86 of the left eye in the right eye face part 85 and a position 96 of the left eye in the left eye face part 95 as feature points. Next, the depth changing unit 170 calculates a direction and a distance from the position 96 of the left eye to the position 86 of the left eye. Then, the depth changing unit 170 shifts the left eye image by the calculated distance in the calculated direction. As a result, the positions of the right eye background part 83 and the right eye face part 85 coincide with the positions of the left eye background part 93 and the left eye face part 95. Namely, the depths of the background part 43 and the face part 85 after the shifting coincide with the depth of the content display region 20 being 0. Herein, shifting only the left eye pixel image 90 is exemplary presented, whereas only the right eye image 80 may be shifted or both of the right eye image 80 and the left eye image 90 may be shifted in the nature of things.

As above, the depth is changed such that the reference depth coincides with the depth of the content display region 20, and thereby, the depth of the content display region 20 coincides with or becomes close to the depth of the reference depth part in the stereoscopic view image 40. As a result, even when the view point is moved between the content display region 20 and the reference depth part in the stereoscopic view image 40, the converging and diverging movement hardly occurs. Moreover, when the viewer perceives the depth of the content display region 20 to be 0, that is, the content display region 20 to be on the screen, also the frequency of the vergence accommodation conflict can be made low. Therefore, burden on the eyes of the viewer of the content can be made light.

In addition, the case where the depth of the content display region 20 is 0 and feature points exist at the reference depth is described, whereas also in the case where the depth of the content display region 20 is not 0 and feature points do not exist, the depth can be changed similarly. For example, supposing that the depth of the content display region 20 is $D_0$ and the reference depth is $D_1$, the depth to be changed by the depth changing unit 170 is $D_0$-$D_1$. Accordingly, the depth changing unit 170 calculates the direction and the distance for changing the depth by $D_0$-$D_1$. Then, the depth changing unit 170 shifts the left eye image or the right eye image by the calculated distance in the calculated direction.

As mentioned above, although changing the depth by shifting is described, shifting the right eye image 80 and the left eye image 90 can cause the width of the stereoscopic view image 40 after the shifting to be larger than the width of the display section 30. Therefore, when the width of the stereoscopic view image 40 after the shifting is larger than the width of the display section 30 in which the stereoscopic view image 40 is disposed in the display region 20 of the content, the depth changing unit 170, for example, partly trims the stereoscopic view image 40 after the shifting so as to match the display section 30. This point is specifically described with reference to FIG. 10.

Figure 10:
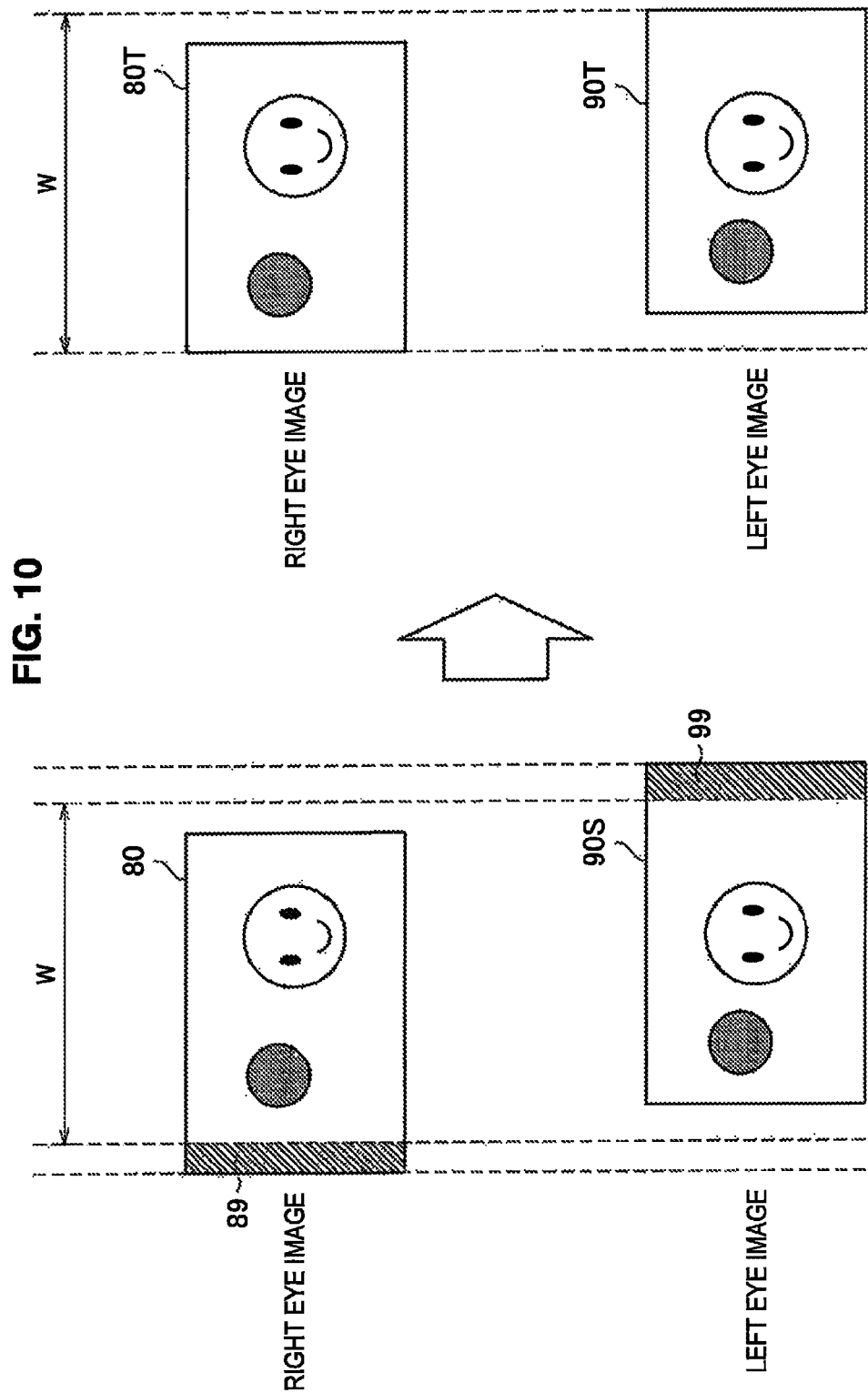
FIG. 10 is an explanatory drawing for explaining a first example of trimming the stereoscopic view image after the shifting.

FIG. 10 is an explanatory drawing for explaining a first example of trimming the stereoscopic view image 40 after the shifting. Referring to FIG. 10, the right eye image 80 and a left eye image 90S after the shifting of the stereoscopic view image 40 are presented. Herein, it is supposed that the width of the display section 30 in which the stereoscopic view image 40 is disposed is W. Herein, since the stereoscopic view image 40 after the shifting is a combination of the right eye image 80 and the left eye image 90S after the shifting, the width of the stereoscopic view image 40 after the shifting is larger than the width W of the display section 30. Therefore, the depth changing unit 170 trims, for example, an edge part 89 of the right eye image 80 and an edge part 99 of the left eye image 90S after the shifting such that the stereoscopic view image 40 after the shifting falls into the display section 30. As a result, a right eye image 80T and a left eye image 90T after the trimming fall into the width W of the display section 30.

Due to such trimming, even when the depth of the stereoscopic view image 40 is changed by shifting, the stereoscopic view image 40 after the shifting can be allowed to fall into the display section 30 in the content display region 20.

According to the above-mentioned trimming, there is sometimes a case where a pop-out part contained in the left eye image or the right eye image is also trimmed Namely, there is sometimes a case where a pop-out part in the stereoscopic view image 40 partly lacks. As a result, depth perception distortion regarding the display section 30 frame being the image frame occurs. Namely, the viewer feels discomfort since it sees the pop-out part as lacking. Moreover, when only one of the left eye image and the right eye image lacks, since there is a part which the viewer sees it only with any one eye thereof, the viewer feels discomfort still for the relevant part. Therefore, the depth changing unit 170 partly trims, for example, the stereoscopic view image 40 after the shifting other than the pop-out part from the above-mentioned reference depth. This point is specifically described with reference to FIG. 11.

FIG. 11 is an explanatory drawing for explaining a second example of trimming the stereoscopic view image 40 after the shifting. Referring to FIG. 11, similarly to FIG. 10, the right eye image 80 and the left eye image 90S after the shifting of the stereoscopic view image 40 are presented. However, when these right eye images 80 are simply trimmed, also a part 88 of the left eye object part 87 with a larger depth than the reference depth is trimmed. Therefore, the depth changing unit 170 trims a part other than the part 88 of the left eye object part 87. As a result, the right eye image 80T after the trimming contains the part 88 of the left eye object part 87.

According to such trimming, lack of a pop-out part can be prevented. Namely, occurrence of depth perception distortion caused by change in depth due to shifting can be prevented.

Instead of the trimming as mentioned above, the depth changing unit 170 may shrink the size of the stereoscopic view image 40 after the shifting so as to match the display section 30 when the width of the stereoscopic view image 40 after the shifting is larger than the width of the display section 30 in which the stereoscopic view image 40 is disposed in the content display region 20. Also according to such shrinking, the stereoscopic view image 40 after the shifting can be allowed to fall into the display section 30 in the content display region 20.

Moreover, the depth changing unit 170 does not necessarily change the depths of all the stereoscopic view images 40 disposed in the content display region 20. For example, the depth changing unit 170 changes the depth of at least part of the stereoscopic view image 40 when the magnitude of the difference between the reference depth of the stereoscopic view image 40 and the depth of the content display region 20 exceeds a predetermined threshold. Namely, supposing that the depth of the content display region 20 is $D_0$ and the reference depth is $D_1$, when $|D_0-D_1|$ exceeds a predetermined threshold, the depth of the stereoscopic view image 40 is changed, and when $|D_0-D_1|$ is equal to or smaller than the predetermined threshold, the depth of the stereoscopic view image 40 is not changed. As above, by limiting the stereoscopic view images 40 whose depths are changed, the stereoscopic view images 40 that hardly causes the converging and diverging movement or the vergence accommodation conflict can be excluded from the processing targets. As a result, processing amount for changes in depth of the stereoscopic view images 40 can be reduced.

As mentioned above, the depth changing unit 170 changes the depth of the stereoscopic view image 40. Then, for example, the depth changing unit 170 outputs the stereoscopic view image 40 after changing the depth to the drawing unit 180. Moreover, the depth changing unit 170 also outputs the depth of the content display region 20 determined by the depth determination unit 160 as well to the drawing unit 180.

(Drawing Unit 180)

The drawing unit 180 draws the content in the content display region 20. For example, the drawing unit 180 draws the stereoscopic view image 40 after changing the depth in the display section 30 within the content display region 20. An example of the drawn content is described with reference to FIG. 12 and FIG. 13.

Figure 12:
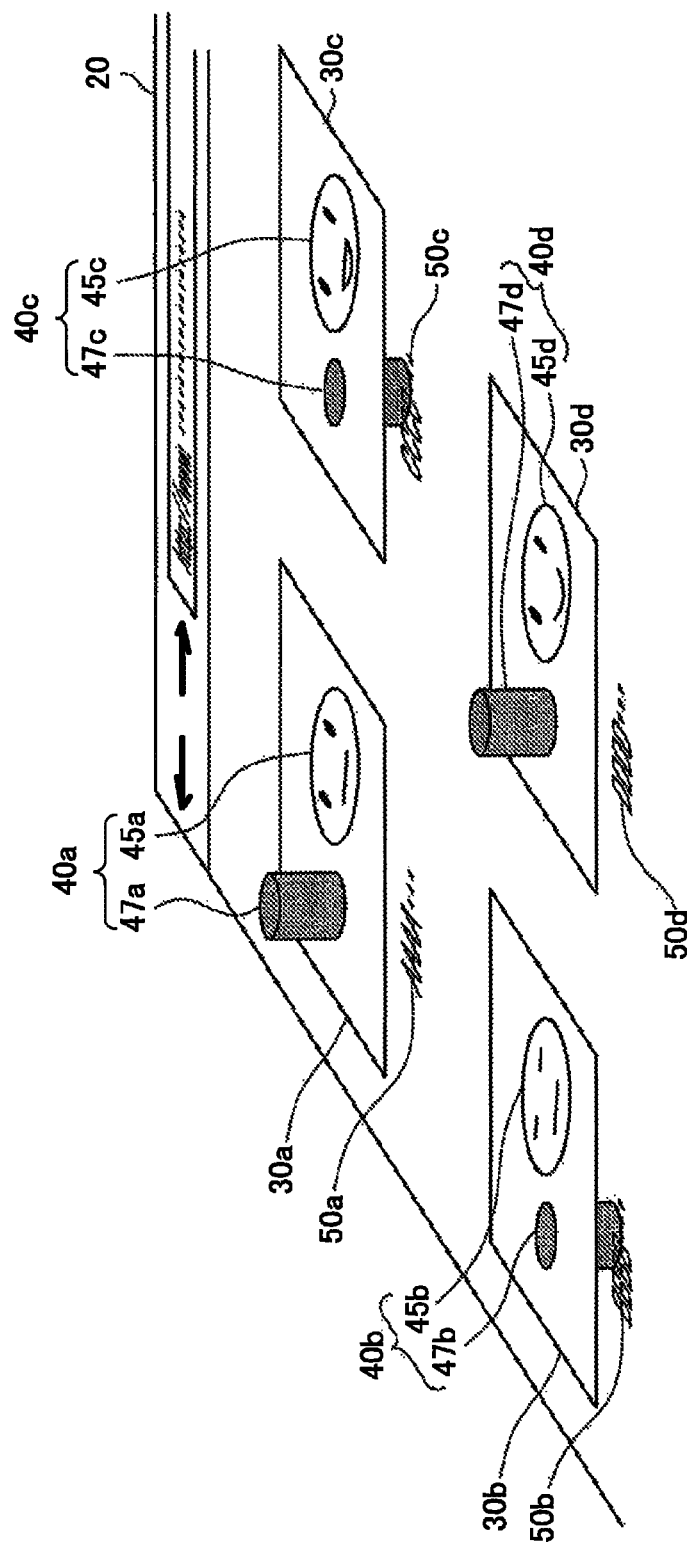
FIG. 12 is an explanatory drawing for explaining one example of content according to an embodiment.

FIG. 12 is an explanatory drawing for explaining one example of the content displayed according to the embodiment. FIG. 12 illustrates imagery of how much depths the viewer perceives for the stereoscopic view images 40 illustrated in FIG. 1 which are displayed according to image processing of the embodiment. Referring to FIG. 12, for example, the depths of the background parts 43 and the face parts 45 which are the reference depth parts in the stereoscopic view images 40 are same as the depths of the content display regions 20 and the text characters 50. Furthermore, only the depths of the object parts 47 in the stereoscopic view images 40 are different from the depth of the content display region 20.

Figure 13:
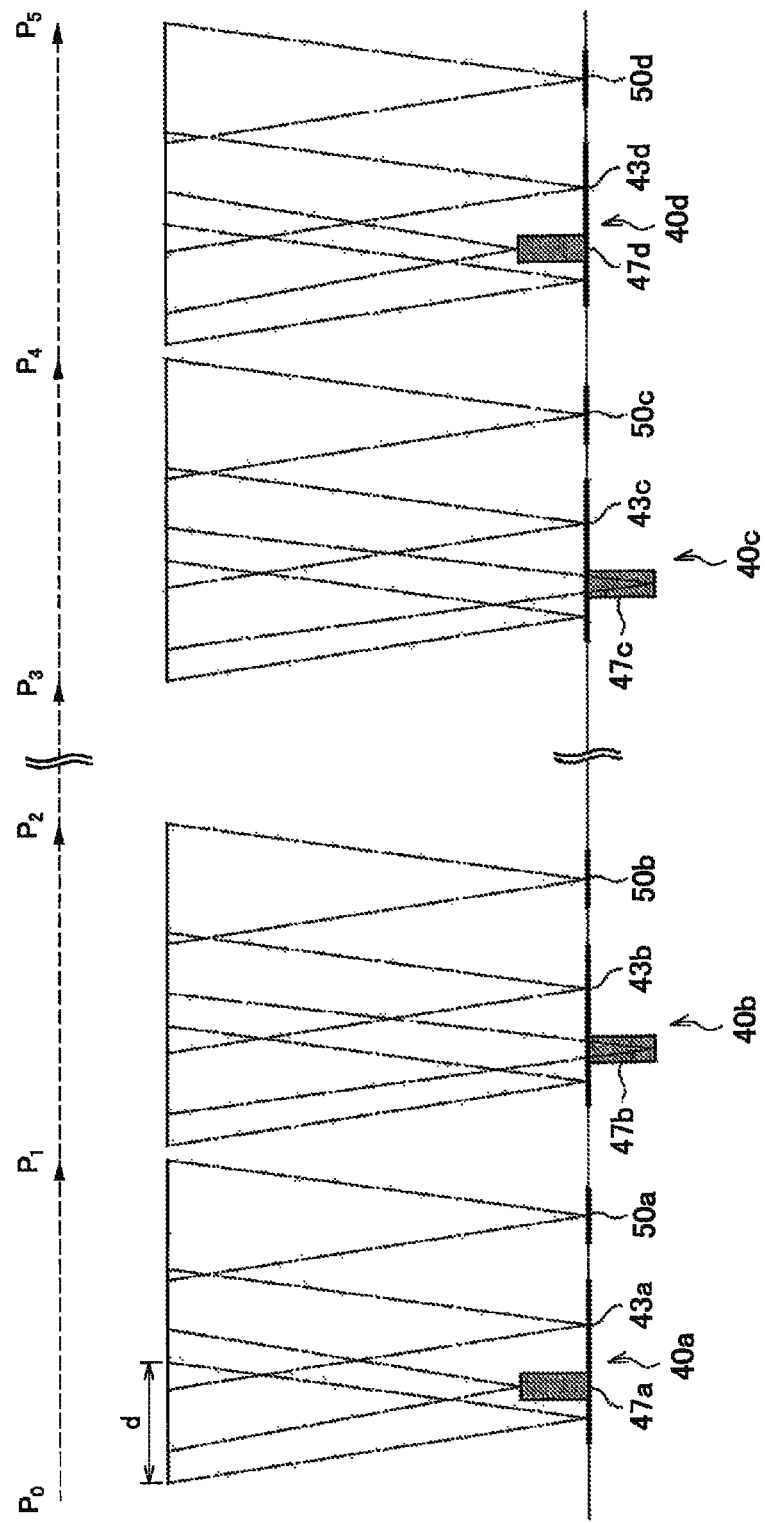
FIG. 13 is an explanatory drawing for explaining one example of view point movement in viewing content displayed according to an embodiment.

FIG. 13 is an explanatory drawing for explaining one example of view point movement in viewing the content displayed according to the embodiment. Referring to FIG. 13, when the view point moves to pass the points $P_0$ to $P_5$ illustrated in FIG. 3 sequentially, the both eyes of the viewer whose pupils' distance is L move the view point from the object parts 47 to other parts or move the view point from other parts to the object parts 47, and only in these stages, perform the converging and diverging movement. As above, when the content is displayed according to the image processing according to the embodiment, the frequency of the converging and diverging movement can be made less than in the case where the content is displayed according to the conventional art as in FIG. 2 and FIG. 4. Moreover, when the depth of the content display region 20 is 0, that is, the viewer perceives the content display region 20 to be on the screen, also the frequency of the vergence accommodation conflict can be made less. As above, according to the embodiment, burden on the both eyes of the viewer can be made small.

In addition, when the trimming is performed except for the pop-out part as described with reference to FIG. 11, for example, the drawing unit 180 draws parts which are in the content display region 20 and other than the stereoscopic view image 40, and after that, draws the trimmed stereoscopic view image 40. According to such an order of drawing, the pop-out part that is not trimmed is overwritten by the other objects displayed within the content display region 20 (for example, text characters 50), and thereby, lack of the pop-out part can be prevented from occurring.

In addition, the drawing unit 180 is implemented, for example, of an HTML renderer when the content is a Web page in HTML format.

As described above, the logical configuration of the image processing apparatus 100 has been described. As one example, when the content is a Web page in HTML format, the analysis unit 130, the decoding unit 140, the depth extraction unit 150, the depth determination unit 160, the depth changing unit 170 and the drawing unit 180 out of the constituents of the image processing apparatus 100 are implemented, for example, of a Web browser.

[2.2 Hardware Configuration]

Figure 14:
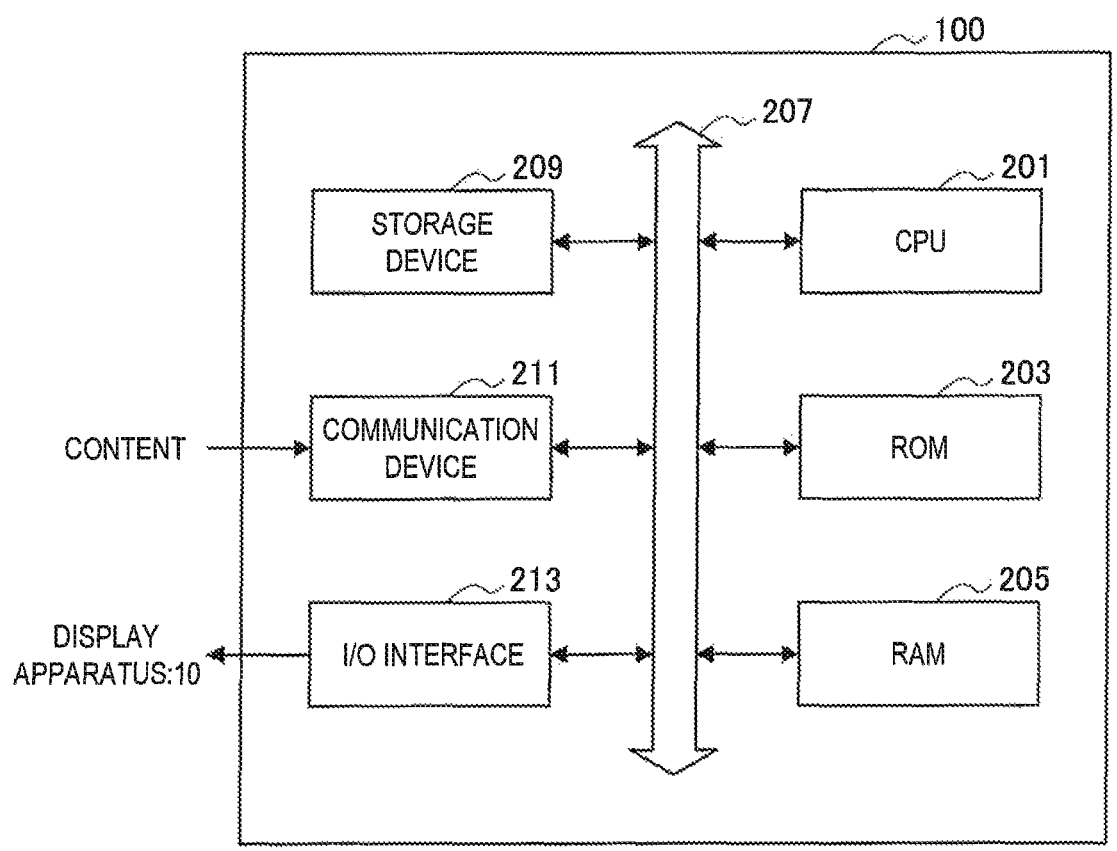
FIG. 14 is a block diagram illustrating one example of a hardware configuration of an image processing apparatus according to an embodiment.

Next, referring to FIG. 14, a hardware configuration of the image processing apparatus 100 according to the embodiment is described. FIG. 14 is a block diagram illustrating one example of a hardware configuration of the image processing apparatus 100 according to the embodiment. Referring to FIG. 14, the image processing apparatus 100 includes a CPU (Central Processing Unit) 201, a ROM (Read Only Memory) 203, a RAM (Random Access Memory) 205, a bus 207, a storage device 209, a communication device 211 and an I/O interface 213.

The CPU 201 functions as an operation processing device and a control device and controls overall operations or a part thereof in the image processing apparatus 100 according to various kinds of programs recorded in the ROM 203 or the storage device 209. The ROM 203 stores the programs, operation parameters and the like used by the CPU 201. The RAM 205 primarily stores the programs used by the CPU 201, the parameters that properly change during the execution of the programs, and the like. The bus 207 connects the CPU 201, the ROM 203 and the RAM 205 to one another. To the bus 207, the storage device 209, the communication device 211 and the I/O interface 213 are further connected.

The recording medium 209 stores various data such, for example, as basic software such as an OS (Operating System) and applications. Herein, examples of the recording medium 209 include, for example, a magnetic recording medium such as a hard disk drive (Hard Disk), an EEPROM (Electrically Erasable and Programmable Read Only Memory), a nonvolatile memory (nonvolatile memory) such as a flash memory (flash memory), an MRAM (Magnetoresistive Random Access Memory), an FeRAM (Ferroelectric Random Access Memory) and a PRAM (Phase change Random Access Memory), whereas they are not limited to the above.

The communication device 211 is, for example, a communication interface configured of a communication device for connecting to a network. The communication device 211 is, for example, a wired or wireless LAN (Local Area Network), Bluetooth (trademark), communication card for WUSB (Wireless USB), or the like. Moreover, the communication device 211 may be a router for optical communication, a router for ADSL (Asymmetric Digital Subscriber Line), a modem for various kinds of communication, or the like. The relevant communication device 211 can transmit and receive signals and the like to/from other communication devices according to a predetermined protocol such, for example, as TCP/IP.

The I/O interface 213 connects the image processing apparatus 100, for example, to the display apparatus 10. Herein, examples of the I/O interface 213 include, for example, a USB (Universal Serial Bus) terminal, a DVI (Digital Visual Interface) terminal, an HDMI (High-Definition Multimedia Interface) terminal and the like, whereas they are not limited to the above.

<3. Flow of Processing>

Figure 15:
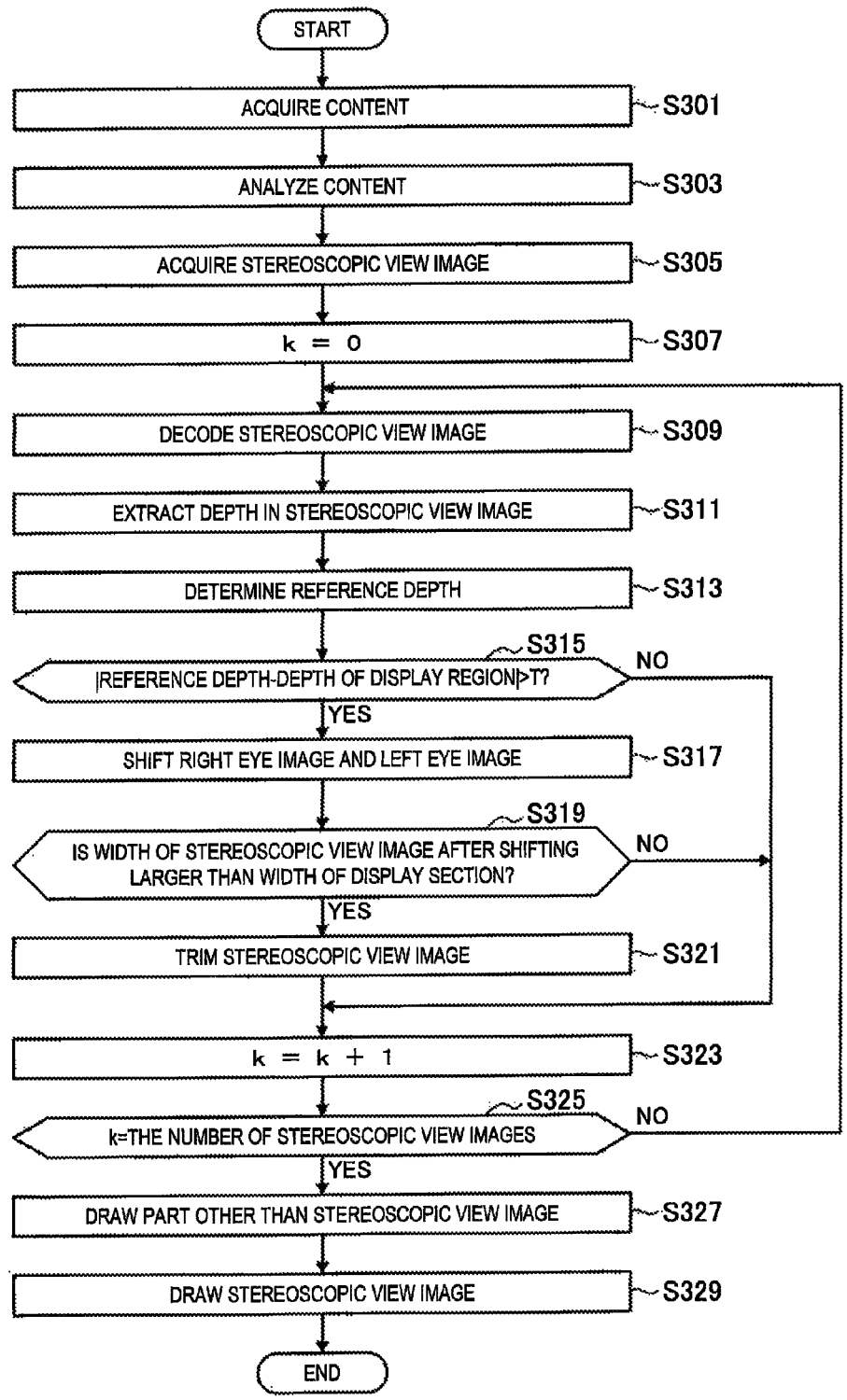
FIG. 15 is a flowchart illustrating one example of schematic flow of image processing according to an embodiment.

Hereafter, referring to FIG. 15, one example of the image processing according to the embodiment is described. FIG. 15 is a flowchart illustrating one example of schematic flow of the image processing according to the embodiment.

First, in step S301, the analysis unit 130 acquires the content outputted by the communication unit 110 or acquires the content stored in the storage unit 120. Next, in step S303, the analysis unit 130 analyzes the relevant content. Moreover, in step S303, the analysis unit 130 acquires the stereoscopic view images 40 contained in the analyzed content. Then, in step S307, a counter k for counting the stereoscopic view images 40 that have been processed is set to 0.

Next, in step S309, the decoding unit 140 decodes the stereoscopic view image 40. Then, in step S311, the depth extraction unit 150 extracts the depths in the stereoscopic view image 40 from the left eye image and the right eye image of the stereoscopic view image 40.

Next, in step S313, the depth determination unit 160 determines the reference depth of the stereoscopic view image 40 disposed in the display region 20 of the content.

Next, in step S315, the depth changing unit 170 determines whether or not the magnitude of the difference between the reference depth of the stereoscopic view image 40 and the depth of the content display region 20 exceeds a predetermined threshold T. When the relevant magnitude of the difference exceeds the threshold T, the process is put forward to step S317. On the other hand, otherwise, the process is put forward to step S323.

In step S317, the depth changing unit 170 changes the depth of the stereoscopic view image 40 by shifting the right eye image 80 or the left eye image 90 of the stereoscopic view image 40 in the right/left direction. Then, in step S319, the depth changing unit 170 determines whether or not the width of the stereoscopic view image 40 after the shifting is larger than the width of the display section 30 in which the stereoscopic view image 40 is disposed in the display region 20 of the content. When the width of the stereoscopic view image 40 after the shifting is larger, the process is put forward to step S321. On the other hand, otherwise, the process is put forward to step S323.

In step S321, the depth changing unit 170 partly trims the stereoscopic view image 40 after the shifting so as to match the display section 30.

In step S323, the counter k for counting the stereoscopic view images 40 that have been processed is incremented by 1. Then, in step S325, when the counter k is equal to the number of the stereoscopic view images 40 disposed in the content display region 20, the process is put forward to step S327. Otherwise, the process is returned to step S309.

In step S327, the drawing unit 180 draws the part other than the stereoscopic view images 40 in the content display region 20. Then, in step S329, the drawing unit 180 draws the stereoscopic view images 40 including the trimmed stereoscopic view images 40.

<4. Summary>

In the above, using FIGS. 1 to 15, the image processing apparatus 100 according to an embodiment of the present disclosure has been described. According to the embodiment, by changing the depth such that the reference depth coincides with the depth of the content display region 20, the depth of the content display region 20 coincides with or becomes close to the depth of the reference depth part in the stereoscopic view image 40. As a result, even when the view point is moved between the content display region 20 and the reference depth part in the stereoscopic view image 40, the converging and diverging movement hardly occurs. Moreover, when the depth of the content display region 20 is 0, that is, the viewer perceives the content display region 20 to be on the screen, also the frequency of the vergence accommodation conflict can be made less. Therefore, burden on the eyes of the viewer of the content can be made small.

Moreover, by using pixel numbers for individual depths in determining the reference depth, the reference depth close to the depths of more parts in the stereoscopic view image 40 can be obtained. In other words, parts having the same depth as or depths close to the reference depth in the stereoscopic view image 40, that is, reference depth parts can be made more. As a result, after changing the depth, the depth of the content display region 20 coincides with or becomes close to the depths of more parts in the stereoscopic view image 40 (reference depth parts). Therefore, the frequency of the converging and diverging movement can be made less.

Moreover, by using pixels contained in the edge part of the stereoscopic view image 40 but not the pixels over the whole stereoscopic view image 40, the reference depth close to the depth of the part positioning continuously to the content display region 20 can be obtained. In other words, the depth of the part positioning continuously to the content display region 20 is a depth close to the reference depth. As a result, after changing the depth, the depth of the content display region 20 coincides with or becomes close to the depth of the part which positions continuously thereto and is in the stereoscopic view image 40. Therefore, in moving the view point sequentially, the frequency of the converging and diverging movement can be made less.

Moreover, by trimming the stereoscopic view image 40 after the shifting, the stereoscopic view image 40 after the shifting can be allowed to fall into the display section 30 in the content display region 20. Moreover, by performing the trimming except for the pop-out part from the reference depth, lack of the pop-out part in the stereoscopic view image 40 can be prevented. Namely, depth perception distortion caused by changing the depth due to shifting can be prevented from occurring.

The preferred embodiments of the present disclosure have been described above in detail with reference to the accompanying drawings, whilst the present disclosure is not limited to the above examples. A person skilled in the art of the present disclosure may find various alternations and modifications within the scope of the appended claims, and it should be understood that they will naturally come under the technical scope of the present disclosure.

For example, the steps of the image processing in the specification are not necessarily processed chronologically in the order represented in the flowchart. For example, the steps of the image processing may be processed differently from the order represented in the flowchart or processed in parallel.

Moreover, a computer program causing the hardware such as the CPU, ROM and RAM built in the image processing apparatus to function similarly to the constituents of the above-mentioned image processing apparatus can also be created. Moreover, a recording medium storing the relevant computer program can also be provided.

Additionally, the present technology may also be configured as below.

(1)

An image processing apparatus including:

a depth determination unit that determines a reference depth of a stereoscopic view image disposed in a display region of content; and a depth changing unit that changes a depth of at least a part of the stereoscopic view image such that a depth of the display region of the content coincides with the determined reference depth.

(2)

The image processing apparatus according to (1), wherein the depth changing unit changes the depth of the stereoscopic view image by shifting a left eye image or a right eye image of the stereoscopic view image in a right/left direction.

(3)

The image processing apparatus according to (2), wherein, when a width of the stereoscopic view image after the shifting is larger than a width of a display section in which the stereoscopic view image is disposed in the display region of the content, the depth changing unit partly trims the stereoscopic view image after the shifting so that the image matches the display section.

(4)

The image processing apparatus according to (3), wherein the depth changing unit partly trims the stereoscopic view image after the shifting, other than a part of a pop-out from the reference depth.

(5)

The image processing apparatus according to (4), further including a drawing unit that draws a part which is the display region of the content and other than the stereoscopic view image, and after that, draws the trimmed stereoscopic view image.

(6)

The image processing apparatus according to (2), wherein, when a width of the stereoscopic view image after the shifting is larger than a width of a display section in which the stereoscopic view image is disposed in the display region of the content, the depth changing unit shrinks a size of the stereoscopic view image after the shifting so that the image matches the display section.

(7)

The image processing apparatus according to any one of (1) to (6), wherein, when a magnitude of a difference between the reference depth of the stereoscopic view image and the depth of the display region of the content exceeds a predetermined threshold, the depth changing unit changes the depth of at least a part of the stereoscopic view image.

(8)

The image processing apparatus according to any one of (1) to (7), wherein the depth determination unit determines the reference depth on a basis of pixel numbers for individual depths in the stereoscopic view image.

(9)

The image processing apparatus according to any one of (1) to (7),
wherein the depth determination unit determines the reference depth on a basis of a largest depth and a smallest depth out of depths for individual pixels in the stereoscopic view image.

(10)

The image processing apparatus according to (9),
wherein the pixels are pixels contained in an edge part of the stereoscopic view image.

(11)

The image processing apparatus according to any one of (1) to (10),
wherein the content is a Web page in HTML format, and
wherein the image processing apparatus further includes an acquisition unit that acquires the stereoscopic view image, utilizing a document object model of the content.

(12)

An image processing method including:
determining a reference depth of a stereoscopic view image disposed in a display region of content; and
changing a depth of at least a part of the stereoscopic view image such that a depth of the display region of the content coincides with the determined reference depth.

(13)

A program for causing a computer to function as:
a depth determination unit that determines a reference depth of a stereoscopic view image disposed in a display region of content; and
a depth changing unit that changes a depth of at least a part of the stereoscopic view image such that a depth of the display region of the content coincides with the determined reference depth.

REFERENCE SIGNS LIST

10 Display apparatus
20 Content display region
30 Display section
40 Stereoscopic view image
60 Depth map
80 Right eye image
90 Left eye image
100 Image processing apparatus
110 Communication unit
120 Storage unit
130 Analysis unit
140 Decoding unit
150 Depth extraction unit
160 Depth determination unit
170 Depth changing unit
180 Drawing unit

The invention claimed is:

1. An image processing apparatus comprising:
a computer-readable storage medium; and
circuitry configured to
determine, within a depth map of a stereoscopic view image disposed in a display region of content, an individual depth that has a largest pixel count as a reference depth,
change a depth of at least a part of the stereoscopic view image by shifting a left eye image or a right eye image of the stereoscopic view image in a right or left direction such that a depth of the display region of the content coincides with the determined reference depth, and
initiate display of the shifted image.

2. The image processing apparatus according to claim 1, wherein, when a width of the stereoscopic view image after the shifting is larger than a width of a display section in which the stereoscopic view image is disposed in the display region of the content, the circuitry is further configured to partly trim the stereoscopic view image after the shifting so that the image matches the display section.

3. The image processing apparatus according to claim 2, wherein the circuitry is further configured to partly trim the stereoscopic view image after the shifting, other than a part of a pop-out from the reference depth.

4. The image processing apparatus according to claim 3, wherein the circuitry is further configured to draw a part which is the display region of the content and other than the stereoscopic view image, and after that, draw the trimmed stereoscopic view image.

5. The image processing apparatus according to claim 2, wherein the circuitry trims the stereoscopic view image by deleting a part of the stereoscopic view image other than the part of the pop-out from the reference part.

6. The image processing apparatus according to claim 1, wherein, when a width of the stereoscopic view image after the shifting is larger than a width of a display section in which the stereoscopic view image is disposed in the display region of the content, the circuitry is further configured to shrink a size of the stereoscopic view image after the shifting so that the image matches the display section.

7. The image processing apparatus according to claim 1, wherein, when a magnitude of a difference between the reference depth of the stereoscopic view image and the depth of the display region of the content exceeds a predetermined threshold, the circuitry is configured to change the depth of at least a part of the stereoscopic view image.

8. The image processing apparatus according to claim 1, wherein the circuitry is further configured to determine the reference depth on a basis of a largest depth and a smallest depth out of depths for individual pixels in the stereoscopic view image.

9. The image processing apparatus according to claim wherein the pixels are pixels contained in an edge part of the stereoscopic view image.

10. The image processing apparatus according to claim 1, wherein the content is a Web page in HTML format, and
wherein the circuitry is further configured to acquire the stereoscopic view image, utilizing a document object model of the content.

11. The image processing apparatus according to claim 1, wherein the circuitry is further configured to output the stereoscopic view image in a format of the depth map indicating depth in the stereoscopic view image in monochrome gradations.

12. The image processing apparatus according to claim 11, wherein the monochrome gradation illustrates a color closer to white for a part in the stereoscopic view image having a larger depth.

13. The image processing apparatus according to claim 11, wherein the monochrome gradation illustrates a color closer to black for a part in the stereoscopic view image having a smaller depth.

14. The image processing apparatus according to claim 1, wherein the circuitry is further configured to specify predetermined widths for the individual depth having the largest pixel number.

15. The image processing apparatus according to claim 1, wherein the circuitry is further configured to determine the individual depth within a specified predetermined width as the reference depth.

16. The image processing apparatus according to claim 1, wherein the depth map comprises a plurality of individual depths, and
wherein the circuitry is further configured to count a number of pixels of each individual depth within the depth map.

17. An image processing method, the method being executed via at least one processor having circuitry, and comprising:
determining, within a depth map of a stereoscopic view image disposed in a display region of content, an individual depth that has a largest pixel count as a reference depth;
changing a depth of at least a part of the stereoscopic view image by shifting a left eye image or a right eye image of the stereoscopic view image in a right or left direction such that a depth of the display region of the content coincides with the determined reference depth; and
displaying the shifted image.

18. A non-transitory computer-readable storage medium having stored thereon a program, which when executed by a computer causes the computer to execute a method, the method comprising:
determining, within a depth map of a stereoscopic view image disposed in a display region of content, an individual depth that has a largest pixel count as a reference depth;
changing a depth of at least a part of the stereoscopic view image by shifting a left eye image or a right eye image of the stereoscopic view image in a right or left direction such that a depth of the display region of the content coincides with the determined reference depth; and
displaying the shifted image.

* * * * *